United States Patent
Li et al.

(10) Patent No.: US 11,459,881 B2
(45) Date of Patent: Oct. 4, 2022

(54) OPTICAL SIGNAL BASED RESERVOIR CHARACTERIZATION SYSTEMS AND METHODS

(71) Applicant: HALLIBURTON ENERGY SERVICES, INC., Houston, TX (US)

(72) Inventors: Jian Li, Bellaire, TX (US); Christopher Michael Jones, Katy, TX (US); James M. Price, Cypress, TX (US); Julia Golovko, Houston, TX (US); Bin Dai, Spring, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 16/883,606

(22) Filed: May 26, 2020

(65) Prior Publication Data
US 2021/0372279 A1 Dec. 2, 2021

(51) Int. Cl.
*E21B 49/00* (2006.01)
*H04Q 9/00* (2006.01)
*E21B 47/12* (2012.01)

(52) U.S. Cl.
CPC .............. *E21B 49/00* (2013.01); *H04Q 9/00* (2013.01); *E21B 47/12* (2013.01); *H04Q 2209/84* (2013.01)

(58) Field of Classification Search
CPC ........ E21B 49/00; E21B 47/12; E21B 47/135; E21B 47/138; H04Q 9/00; H04Q 2209/84
See application file for complete search history.

(56) References Cited

U.S. PATENT DOCUMENTS

| | | | |
|---|---|---|---|
| 7,617,873 B2 * | 11/2009 | Lovell | E21B 34/066 166/305.1 |
| 9,366,776 B2 | 6/2016 | Xian et al. | |
| 9,404,360 B2 * | 8/2016 | DiFoggio | G01V 1/226 |
| 9,416,647 B2 | 8/2016 | Zuo et al. | |
| 9,702,248 B2 | 7/2017 | Chen | |
| 9,733,191 B2 * | 8/2017 | Bittar | E21B 47/002 |
| 10,012,763 B2 * | 7/2018 | Perkins | G01V 13/00 |
| 11,111,783 B2 * | 9/2021 | Wisinger, Jr. | E21B 49/003 |
| 2009/0235731 A1 | 9/2009 | Zuo et al. | |
| 2009/0312997 A1 | 12/2009 | Freed et al. | |

(Continued)

FOREIGN PATENT DOCUMENTS

| | | | | |
|---|---|---|---|---|
| RU | 2643531 C2 * | 2/2018 | .......... | E21B 47/102 |
| WO | 2017164854 A1 | 9/2017 | | |

OTHER PUBLICATIONS

Castillo, Jimmy et al., "Measurement of the Refractive Index of Crude Oil and Asphaltene Solutions: Onset Flocculation Determination", Energy Fuels 2010, 24, 1, 492-495; Publication Date:Nov. 16, 2009; https://doi.org/10.1021/ef900861d.

(Continued)

*Primary Examiner* — Franklin D Balseca
(74) *Attorney, Agent, or Firm* — Novak Druce Carroll LLP

(57) ABSTRACT

Systems, methods, and computer-readable media for detecting downhole environment characteristics. An optical sensor is deployed to a downhole environment. Optical signal data received from the deployed optical sensor is received by a model configured to determine downhole environment characteristics directly from optical signal data. The model determines a downhole environment characteristic from the optical signal data and provides the determined characteristic to a user.

23 Claims, 6 Drawing Sheets

(56) References Cited

U.S. PATENT DOCUMENTS

| | | |
|---|---|---|
| 2010/0265509 A1 | 10/2010 | Jones et al. |
| 2014/0311803 A1 | 10/2014 | Bittar et al. |
| 2016/0177715 A1 | 6/2016 | Indo et al. |
| 2019/0120049 A1* | 4/2019 | Chen .................. G01N 33/2823 |
| 2021/0048556 A1* | 2/2021 | Sun ........................ E21B 49/00 |

OTHER PUBLICATIONS

International Search Report and Written Opinion, PCT Application No. PCT/US2020/035358, dated Feb. 24, 2021.

* cited by examiner

OPTICAL SIGNAL BASED RESERVOIR CHARACTERIZATION SYSTEMS AND METHODS

TECHNICAL FIELD

The present technology pertains to geological analysis and more specifically to determining reservoir architectures.

BACKGROUND

In the oil and gas industry, it is often imperative to characterize spatial and temporal features of a reservoir in order to determine drilling and production strategies and/or gauge progress of the respective well. In general, optical signals can be used to characterize downhole samples according to, for example, composition, phase, density, gas-to-oil ratio (GOR) and the like and use the characterization of the sample to further characterize (e.g., predict) spatial and temporal relations of the respective reservoir from which the samples were taken. However, uncertainties and complexities are introduced in the process of characterizing downhole reservoir environments based on samples taken from the reservoir environments by using intermediary steps and analysis.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1A:
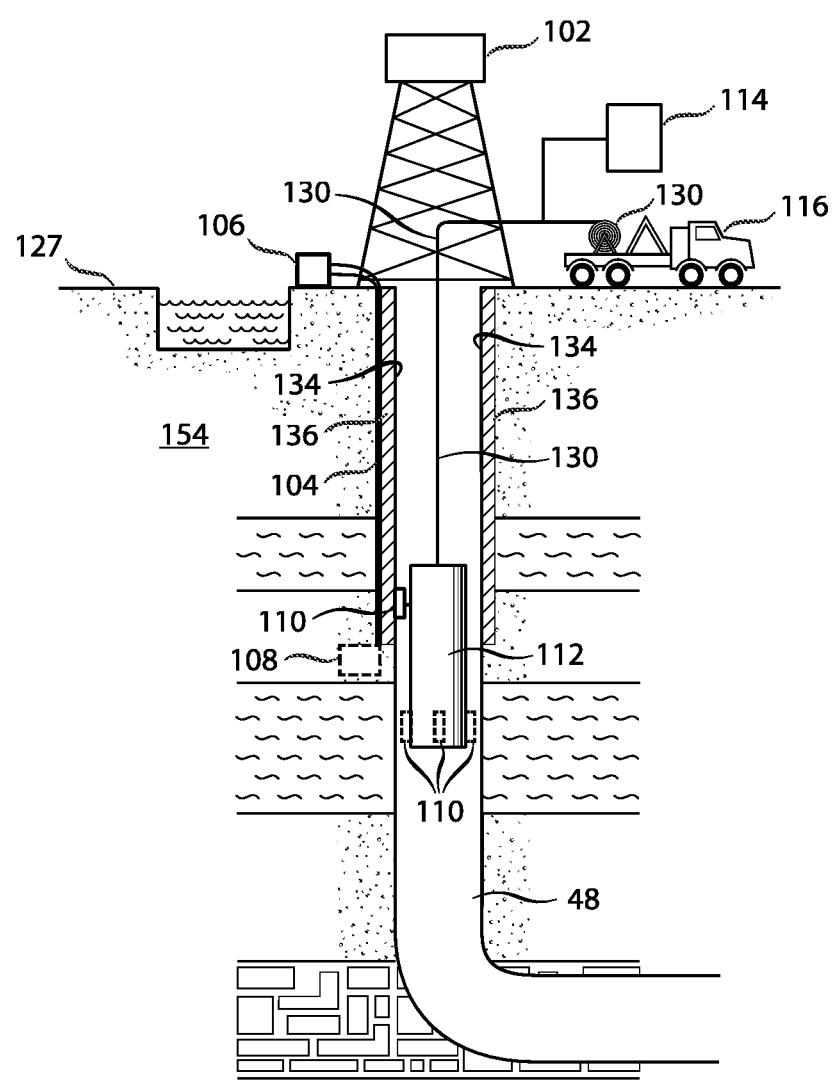
FIG. 1A illustrates a schematic diagram of an operating environment for characterizing downhole environments based on optical signal data according to some examples.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

The term "coupled" is defined as connected, whether directly or indirectly through intervening components, and is not necessarily limited to physical connections. The term "substantially" is defined to be essentially conforming to the particular dimension, shape or other word that substantially modifies, such that the component need not be exact. For example, substantially rectangular means that the object in question resembles a rectangle, but can have one or more deviations from a true rectangle. The phrase "wellbore tubular" is defined as one or more types of connected tubulars as known in the art, and can include, but is not limited to, tubing, production tubing, jointed tubing, coiled tubing, casings, liners, drill pipe, landing string, combinations thereof, or the like. The term "transceiver" is defined as a combination of a transmitter/receiver in one package but can include a separate transmitter and a separate receiver in one package or two packages.

As used herein, the "position" of an object can refer to a placement of the object, location of the object, angle of the object, plane of the object, direction of the object, distance of the object, azimuth of the object, axis of the object, inclination of the object, horizontal position of the object, vertical position of the object, and so forth. Moreover, the "position" of an object can refer to the absolute or exact position of the object, the measured or estimated position of the object, and/or the relative position of the object to another object.

Typical techniques of determining characteristics of downhole environments (e.g., a reservoir, etc.) of an oil or natural gas well include a two-tiered process of characterizing a downhole sample and then using the characterization of the downhole sample to generate further characterization of the downhole environment from which it was retrieved. For example, a model downhole environment model, taking as input information from downhole samples, may be used to predict the respective downhole environment. However, the two-tiered process may be susceptible to various uncertainties and opportunity for introduction of errors as a result of intermediary steps.

Disclosed herein are systems and methods for determining spatial and temporal features of a downhole environment, such as a reservoir, without an intermediate step of characterizing a sample. As a result, characterizations may be more accurate than they would otherwise be and processing can be simplified and so reduce the likelihood of errors or faults being introduced.

In effect, optical signals can be used, in-situ and/or I real time, to characterize spatial and temporal features of, for example, a reservoir as well as evolutions and relations of the reservoir, such as, for example and without imputing limitation, reservoir architecture, reservoir continuity and compositional grading, interval productivity, reservoir charging mechanisms, filling histories, and/or migration pathways. The optical signals may be received by an optical sensor, such as, for example and without imputing limitation, a fiber optic sensor or a multivariate optical computing (MOC) device or the like. Processing the optical signals may occur on the sensor, on-site at the surface of the well, at a remote off-site server or location using live and/or stored data retrieved from the well, or some combination thereof. For example, a MOC device may include one or more purpose-built multivariate optical elements (MOEs) configured to detect specific optical signal characteristics and, as a result, determine particular characteristics of the downhole environment based on each of the MOE signals. Each MOE may be constructed based on training data retrieved by a spectrometer and used to build one or more convolutional matrices for processing optical signals.

Various models, strategies, and/or processes can be applied to the optical signals to determine reservoir characteristics. For example, and without imputing limitation, a convolutional neural network (CNN) can be trained to identify reservoir architecture using historical data and executed, in part, by a MOE to determine a reservoir architecture from optical signals received by a downhole MOC tool.

The optical signal processing approaches disclosed herein can be implemented in various wellbore environments and phases of producing and utilizing a well. Additionally, various tubulars may be provided downhole for production or delivery of fluids downhole.

In general, an optical complex refractive index, N, can be defined as equation 1 or equation 2 below:

$$N = n + ik \quad (1)$$

$$N = n - ik \quad (2)$$

In equations 1 and 2, n is the real index of refraction, k is the extinction coefficient, and i is the imaginary square root of $-1$. Optical anisotropy is related to the characteristic of a sample in which the optical complex refractive index, N, is dependent upon the polarization and propagation direction of light inside the sample. One macroscopically measurable effect of optical anisotropy (e.g., refraction) is the capability of a material to alter a polarization state of incident light after it interacts (e.g., transmits, reflects, scatters, etc.) with the material. This capability can be defined as $\rho$. For example, as light travels through a material (e.g., a borehole environment sample), a polarization plane of linearly polarized light may undergo continuous rotation.

In one example, the real index of refraction, N, changes to the real index of refraction, $\Delta N$, and a spectra, $\rho$, can be directly measured and respective temporal and/or spacial distributions can be determined based on repeated measurements. The direct measurements and distributions may then be used to determine characteristics, evolutions, and/or relations of spacial and/or temporal features of a downhole environment, such as a reservoir.

In one example, optical measurements of the real index of refraction, N, changes to, or delta of, the real index of refraction, $\Delta N$, and the local environment spectra, $\rho$, are taken at various points, either temporal or spacial (e.g., every 5 meters, 10 meters, every 5 minutes, 10 minutes, etc.), along a respective well path. A trend, or lack thereof, of changes to the real index of refraction, delta of the real index of refraction, and/or local environment spectra can be correlated to particular well environment characteristics. In some examples, machine learning methods such as, for example and without imputing limitation, regression modeling, Bayesian models, neural networks, ensemble models, or mixed methods approaches may be used to determine the correlations. Nevertheless, the correlations can be mapped to particular geological features, or groupings of features, across multiple well paths and the mappings stored for later use. As a result, analysis of the observed trends may be performed entirely in the optical domain and without introducing potentiality for errors or failure events as found in optical-to-chemical and chemical-to-geological approaches.

The disclosure now turns to a series of figures providing examples of the methods and systems disclosed above. It is understood that the following figures are provided for purposes of explanation and to further understanding. System components, method blocks, and the like can be added, removed, and/or reorganized without departing from the spirit and scope of the disclosure.

An exemplary downhole wellbore environment for implementation in a wireline system is illustrated in FIG. 1A. As illustrated in FIG. 1A, a downhole tool unit 112 can be employed with wireline systems to carry out logging, or other sensing and detecting operations. The collected data can include various properties and conditions, such as formation rock properties, fluid density, temperature, pressure, resistivity, porosity, or, importantly, optical signal data, among other characteristics and properties in a downhole environment. A downhole tool unit 112 can be lowered into the wellbore 48 of formation 154 by wireline conveyance 130. A casing 134 can be secured within the wellbore 48 by a casing material 136, such as cement.

The wireline conveyance 130 can be anchored in the rig 102 or portable or mobile units such as a truck 116. The wireline conveyance 130 can provide support for the tool 112, enable communication with the tool processors and units (e.g., 106 and/or 114) on the surface 127 outside the wellbore 48, and provide a power supply. The wireline conveyance 130 can include one or more wires, wireline, slickline, cables, tubulars, and the like. The wireline conveyance 130 can include fiber optic cabling for carrying out communications. The optical cable can be provided in an interior and/or exterior of the conveyance 130. The wireline conveyance 130 can be sufficiently strong and flexible to tether the downhole tool unit 112 through the wellbore 48, while also permitting communication through the wireline conveyance 130 to surface tools unit 114. Additionally, power can be supplied via the wireline conveyance 130 to meet power requirements of the tool 112.

A wire system 104 can be provided along the casing 134. For example, the wire system 104 can extend alongside an external portion of the casing 134. The wire system 104 can include non-electroconductive cables, such as fiber optic cables, which can be coupled with processing system 106 on the surface 127. The non-electroconductive cables, such as fiber optic cables, may also be coupled with processing system 108 downhole, although the processing system 108 may not be implemented in some configurations. The non-electroconductive cables can communicate data, such as detected properties and conditions, with processing system 106. In some configurations, the non-electroconductive cables may also communicate data with processing system 108. The non-electroconductive cables can also be coupled with the wireline conveyance 130 to communicate with other surface tools and processors, such as surface tools unit 114, through the wireline conveyance 130.

Surface tools unit 114 can control the tools 112 and sensors 110. Surface tools unit 114 may be coupled, directly or indirectly, with processing system 106 to control the signals transmitted through the wire system 104. A direct line of communication between tools 112 and wire system 104 may not be necessary. However, in some aspects, the tools 112 and wire system 104 can have a direct line of communication.

Processing systems 106 and 108 can include one or more processors, transceivers, memories, storage devices, sensors, communications interfaces, power supplies, etc. For example, processing systems 106 and 108 can include telemetry units for communicating and processing data and signals. Thus, processing systems 106 and 108 can detect, receive, transmit, store, and process data, such as properties, conditions, and characteristics, for example. As previously mentioned, processing systems 106 and 108 can receive and transmit data via non-electroconductive cables in the wire system 104, as well as the wireline conveyance 130.

The wire system 104 can also include an electric line for carrying signals and currents. The electric line can include one or more electroconductive cables, such as copper cables. Processing system 106 can transmit a signal or current through the electric line in the wire system 104 in order to generate a magnetic field around the wire system 104. The signal can be based on a known or predetermined pattern, such as a current and/or frequency pattern. Processing system 106 can transmit multiple signals and vary the pattern of one or more signals. Moreover, processing system 106 can turn on or off and/or modify or change a pattern or strength of signals transmitted through the electric line.

In some examples, a sensor system 110 can be placed in an inside of the casing 134 for detecting optical signals related to the surrounding borehole environment or the immediate environment internal to the tubular casing. For example, the sensor system 110 can be coupled with the tool 112 inside the casing 134 to receive optical light produced by the tool 112.

Sensor system 110 can communicate the measurements to surface tools unit 114, processing system 106, processing system 108, and/or any other processing tool or system. The measurements can be used to determine downhole environment characteristics. For example, the measurements can be used to directly determine reservoir characteristics from portions of the wellbore 48 beyond the casing 138.

Some characteristics include, for example and without imputing limitation, reservoir architecture, reservoir continuity and compositional grading, interval productivity, reservoir charging mechanisms, filling histories, and migration pathways. In some examples, the characteristics are determined by transmitting optical signal data generated and/or received by the sensor system 110 to processing systems 106 and 108, where one or more models can be applied to the optical signal data. The one or more models may include trained (e.g., supervised or unsupervised) machine learning models, such as neural networks, regression, Bayesian models, etc., rules-based models, or some combination of machine learning and rules-based models.

In some examples, the sensor system 110 can include multiple sensors located radially around an outside of the tool 112 and/or an inside of the casing 134. The multiple sensors can be configured to obtain measurements from their respective locations or placements, which can be used in tandem with the optical signal data such as, for example, by processing it by a model as additional input features.

Figure 1B:
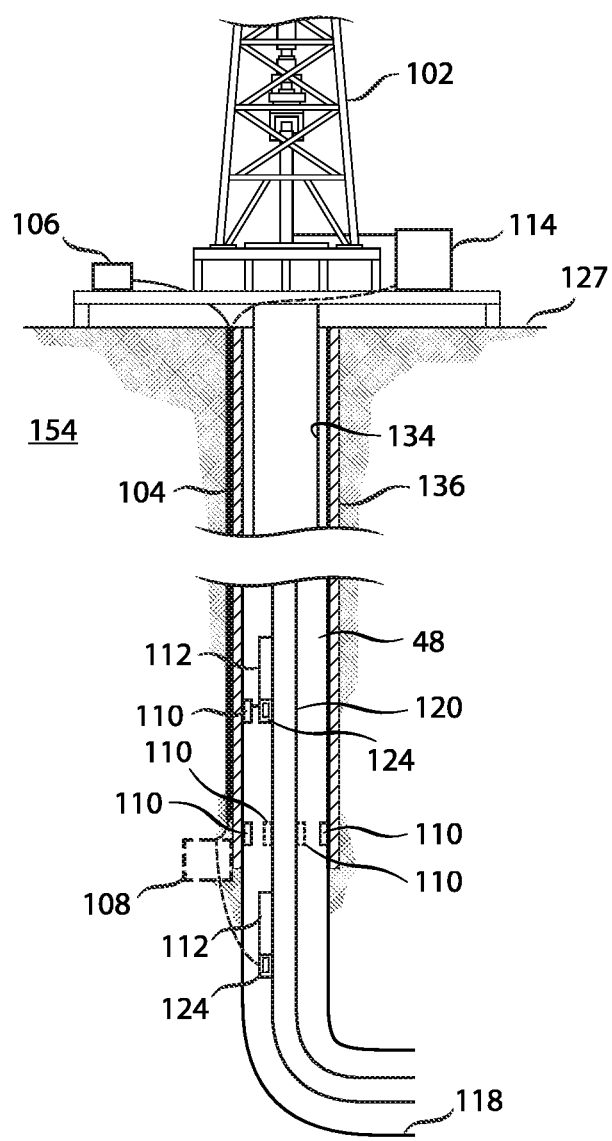
FIG. 1B illustrates a schematic diagram of an operating environment for characterizing downhole environments based on optical signal data according to some examples.

An additional downhole wellbore environment for implementation of the technologies disclosed herein is illustrated in FIG. 1B. As shown, the operating environment can include a rig 102 that is positioned on the earth's surface 127 and extends over and around a wellbore 48 that penetrates a subterranean formation 154 for the purpose of recovering hydrocarbons. As shown, the wellbore 48 may extend substantially vertically away from the earth's surface 127 and transition to a horizontal wellbore portion 118. The wellbore can include a wellbore casing 134, which can be cemented into place in at least a portion of the wellbore 48.

A wellbore tubular 120 can be lowered into the subterranean formation 154 for a variety of drilling, completion, workover, treatment, and/or production processes throughout the life of the wellbore. The wellbore tubular 120 can include those provided in the wellbore during completion operations, where hydrocarbon is withdrawn through the wellbore tubular 120 from producing formations. The wellbore tubular 120 can operate in any of the wellbore orientations (e.g., vertical, deviated, horizontal, and/or curved) and/or types described herein.

One or more downhole tools unit 112 can be coupled with the wellbore tubular 120 within the wellbore 48. One or more telemetry units 124 can be coupled with the wellbore tubular 120 within the wellbore 48. Typically, the one or more downhole tools unit 112 and the one or more telemetry units 124 are coupled on the outside of the wellbore tubular 120. Each downhole tools unit 112 is communicatively coupled with one or more telemetry units 124. For example, fiber optic cable can be provided along the length of the tubular 120 and couple with the tool assemblies for communication to and from the surface 127. Each downhole tools unit 112 can have a corresponding telemetry unit 124 and/or a single telemetry unit can communicate with one or more downhole tools unit 112. Often, performing an operation in the wellbore 48 can require a plurality of different downhole tools. For example, in the completion of a well, a sampling device can sometimes be deployed downhole to collect hydrocarbon samples in a production zone.

To communicate data to the surface tools unit 114, downhole tools unit 112 can include a source assembly. The source assembly can generate an optical signal indicative of the downhole data and can transmit the optical signal towards the surface tools unit 114 via the fiber optic cable. In some examples, the downhole tools unit 112 may include a MOC or the like for producing optical signal data that can be processed by the downhole tools unit 112 (e.g., via onboard processors, etc.) and/or by the surface tools unit 114. At the surface, a receiver assembly can be included in surface tools unit 114 and can receive the optical signal from the source assembly. In some examples, the optical signal can additionally be processed by processors onboard the downhole tools unit 112, such as, for example and without imputing limitation, a MOE configured to determine particular downhole environment properties based on optical signal data.

Wire system 104 can be placed alongside the casing 134. For example, wire system 104 can run alongside an outside of casing 134 and casing material 136. As previously mentioned, wire system 104 can include an electric line and one or more non-electroconductive cables, such as fiber optic cables. The lines or cables in the wire system 104 can be coupled with processing system 106 on the surface 127 and processing system 108 downhole. For example, the electroconductive lines or cables in the wire system 104 can be electrically coupled with the processing system 106 and/or 108, and the non-electroconductive cables can be coupled via a corresponding connector and/or interface, such as a fiber optic interface, connector, module, etc. The lines or cables in the wire system 104 can also communicate with tools unit 112 and/or telemetry unit 124, either directly or indirectly. For example, in some configurations, the lines or cables in the wire system 104 can couple with telemetry unit 124 directly or indirectly through processing system 108 and/or any other intervening wire(s) or device(s).

Sensor system 110 can be placed at one or more locations. For example, sensor system can have a sensor coupled with tools unit 112 and/or telemetry unit 124. Sensor system 110 can also have another sensor coupled with another tools unit 112 or telemetry unit 124 at a different location within the wellbore 48 or tubular 120. In addition or alternatively, sensor system 110 can have multiple sensors radially around the outside of tools unit 112 or tubular 120.

While FIGS. 1A and 1B are illustrated with a rig 102, the present disclosure contemplates that the operations and technologies described herein can be implemented in rigless configurations (i.e., configurations with no rig 102). Moreover, various rigless configurations are contemplated herein. To illustrate, in an example rigless configuration, a mobile crane can be parked near the top of the well 48 (e.g., near the well head). The wireline 130 can run from the truck 116 through two sheave wheels. One of the sheave wheels can be tied to the well head itself and the other held by the mobile crane.

Figure 2:
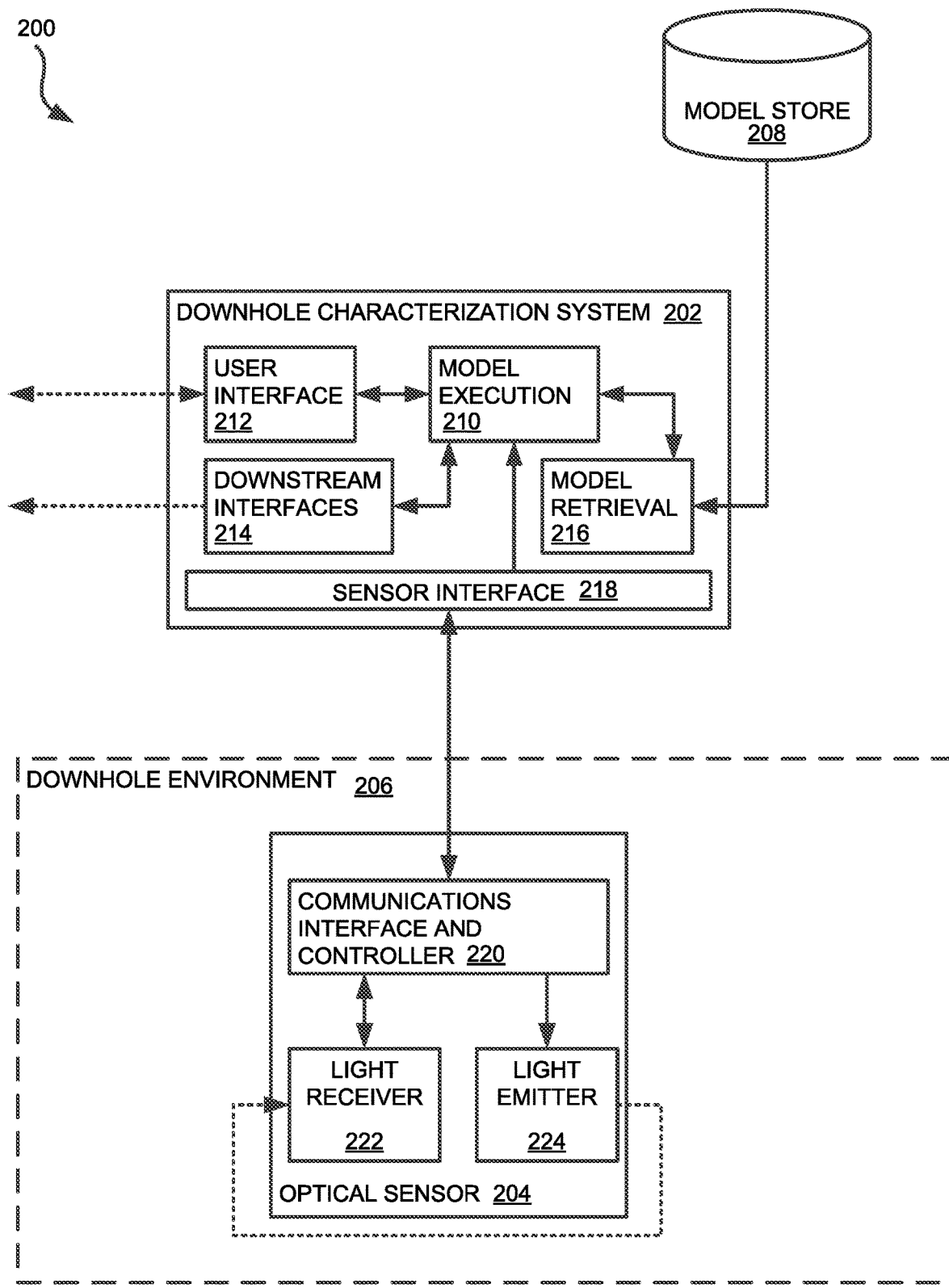
FIG. 2 illustrates a schematic diagram of a system for characterizing downhole environments based on optical signal data according to some examples.

FIG. 2 illustrates an operating environment 200 in which a downhole characterization system 202 determines reservoir characteristics based on downhole optical signal data. Downhole characterization system 202 may be located at a well surface, on a downhole tool, or a installed into a borehole. In some examples, downhole characterization system 202 may be a distributed system, having various components deployed to different locations in communication with each other.

Downhole characterization system 202 receives optical signal data from one or more optical sensors 204 deployed to a downhole environment 206. Downhole characterization system 202 determines characteristics of downhole environment 206 based on the received optical signal data by applying a model retrieved from a model store 208. Model store 208 may be a remote repository (e.g., server hosted database, etc.) storing various models each associated with, for example and without imputing limitation, a particular downhole environment, a characteristic to be determined, a respective well location, and/or a particular user utilizing the model, etc.

Nevertheless, a model retrieval process 216 retrieves the model from model store 208 by determining an appropriate model and providing a respective model identifier (e.g., name, hash, etc.). In some examples, credentials or the like may also be used by model retrieval process 216 to verify that a particular user or entity is authorized to use the retrieved model. The retrieved model is provided to a model execution process 210 to execute the retrieved model on the optical signal data received from optical sensor 204.

The retrieved model itself may be of one or more types. For example, the model may be a trained neural network, trained regression model, rules-based model, a mixed model, an ensemble model, etc. In any case, the retrieved model receives, as feature inputs, one or more optical data signals which are then used to generate a characterization of downhole environment 206. In some examples, model execution process 210 can include data preprocessing, feature engineering, or other data manipulation techniques to prepare the optical signal data for processing by the retrieved model. In some examples, model execution process 210 may include live or online training components, which may update the retrieved model based on information as a result of executing the retrieved model in a live environment.

The determined downhole environment characteristics may be provided to a user via a user interface 212. Likewise, model execution process 210 may transmit the determined downhole environment characteristics to downstream services via one or more downstream interfaces 214 such as, for example, through an application programming interface (API) or the like.

Downhole characterization system 202 communicates with optical sensor 204 via a sensor interface 218. In some examples, sensor interface 218 may include data transformation processing or the like for converting received sensor data into formats and/or protocols interpretable by model execution process 210. In some examples, sensor interface 218 may include additional sensor connections such as, for example and without imputing limitation, vibration sensors, acoustic sensors, pressure sensors, etc. which may provide additional (non-optical) signal data that may be processed by a retrieved model to determine downhole environment characteristics.

Optical sensor 204 includes a communications interface and controller 220 for transmitting optical signal data and/or receiving control signals. A light emitter 224 emits optical light which is refracted and/or reflected by surrounding downhole environment 206 before being received by light receiver 222. Light receiver 222 may convert received optical light into interpretable data signals to be received by downhole characterization system 202 via communications interface and controller 220. In some examples, optical sensor 204 may include a multivariate optical computing device (MOC) and/or light receiver 222 may include or interact with a multivariate optical element (MOE) for performing onboard (e.g., local to optical sensor 204) operations on received optical light.

Figure 3:
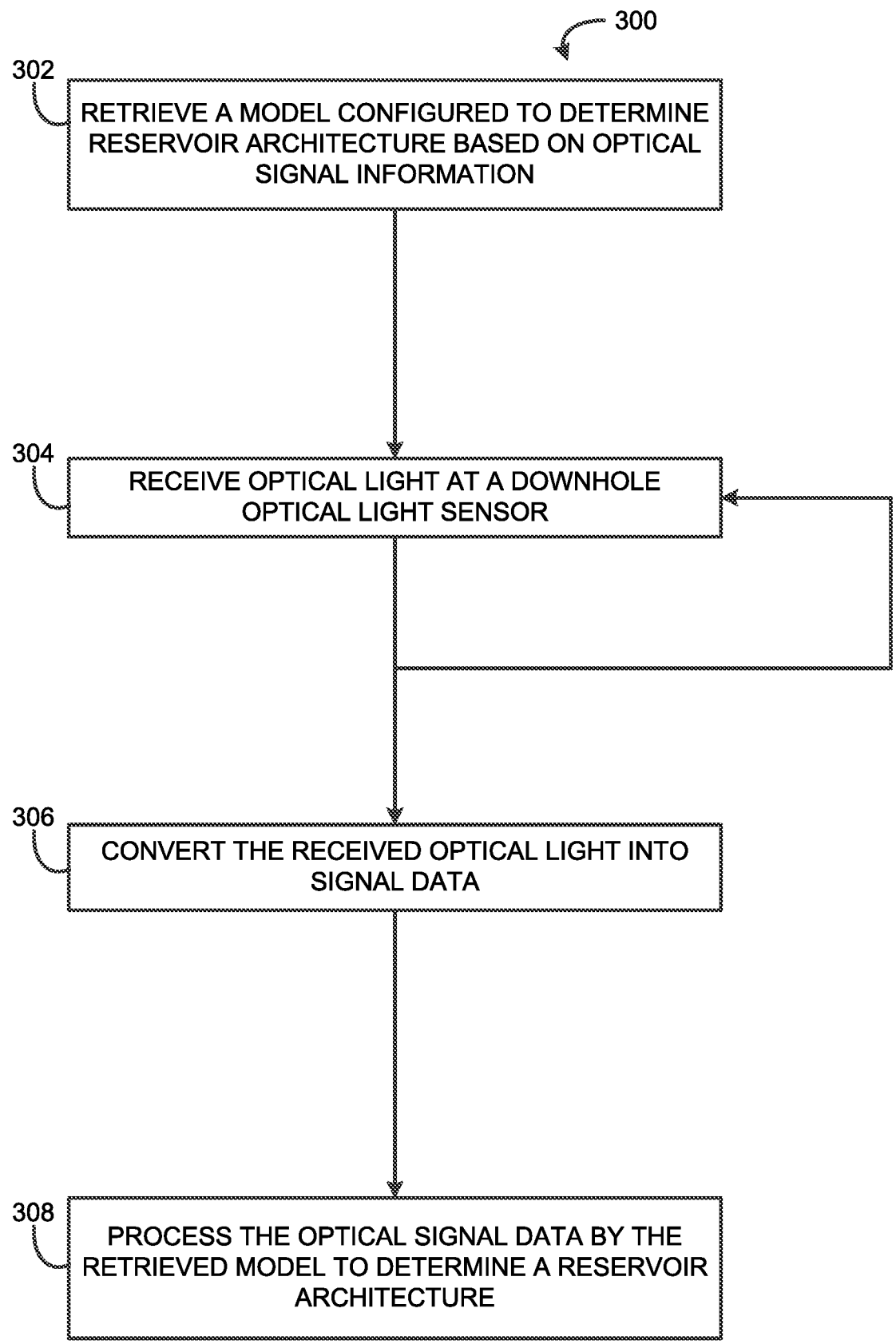
FIG. 3 is a flowchart of a method for characterizing downhole environments according to some examples.

FIG. 3 depicts an example method 300 for determining downhole characteristics directly based on optical signal data transmitted to a surface level processor. Method 300 may be performed by, for example, downhole characterization system 202 and optical sensor 204 discussed above in reference to FIG. 2.

At step 302, a model configured to determine reservoir architecture based on optical signal information is retrieved. The model may be a machine learning model, rules-based model, or some combination of the two. In the case of a machine learning model, neural networks, regressions, Bayesian networks, and the like may be used. While method 300 is discussed with reference to determining a reservoir architecture, this is for explanatory purposes only. It is understood that the model retrieved at step 302 may be configured to determine various downhole environment characteristics such as, for example and without limitation, reservoir continuity, reservoir compositional grading, interval productivity, reservoir charging mechanisms, filling histories, migration pathways, etc.

At step 304, optical light is received at a downhole optical light sensor. The downhole optical light sensor may be substantially similar to optical sensor 204 discussed above. In some examples, the optical light sensor includes onboard computing capabilities, such as a multivariate light computing (MOC), and may determine certain downhole environment characteristics that may, for example, be included with data provided to the retrieved model.

At step 306, the received optical light is converted into signal data for processing by the retrieved model. As stated, the signal data may include additional determined characteristic information. In some examples, such as where a change refractive index or p spectrum is used to determine downhole characteristics (e.g., a longitudinal analysis, rate of change of a downhole characteristic, etc.), optical light received at multiple locations can be combined or packaged before being converted into signal data provided to the model all at once or rapid sequence.

At step 308, the optical signal data is process by the retrieved model to determine a reservoir architecture. In some examples, the determined reservoir architecture is output to a user via a graphical user interface (GUI) or the like. In some examples, the determined reservoir architecture is output to downstream services for further processing and/or analysis, such as in the case of an automated control mechanism or the like.

Figure 4A:
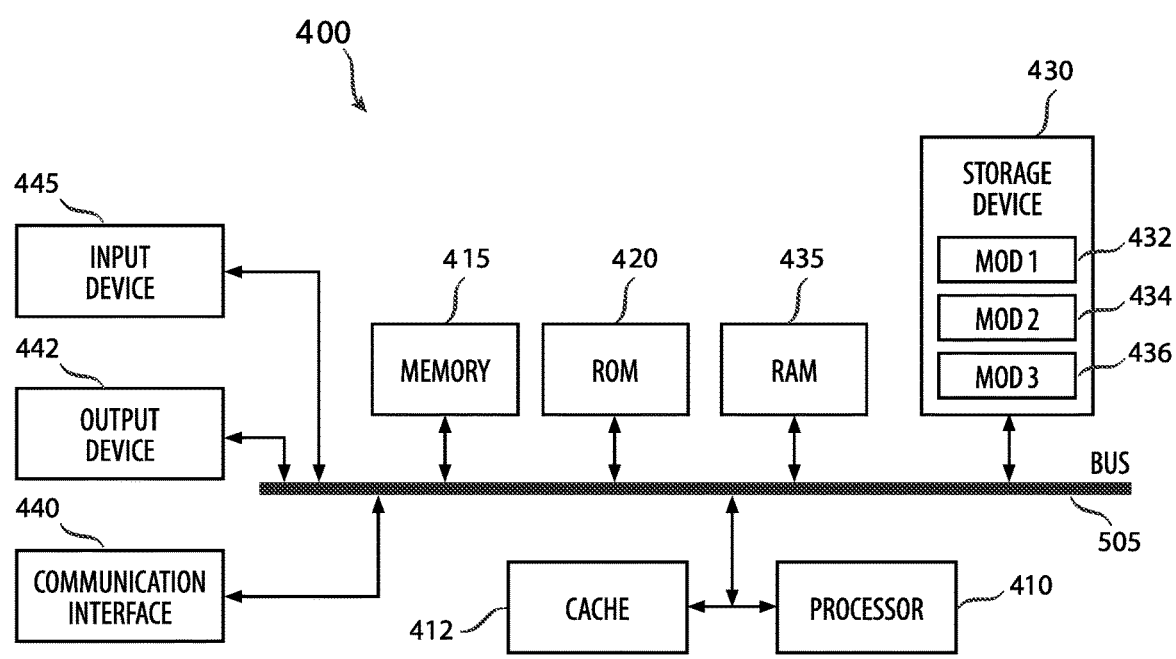
FIG. 4A and FIG. 4B illustrate schematic diagrams of example system embodiments.
Figure 4B:
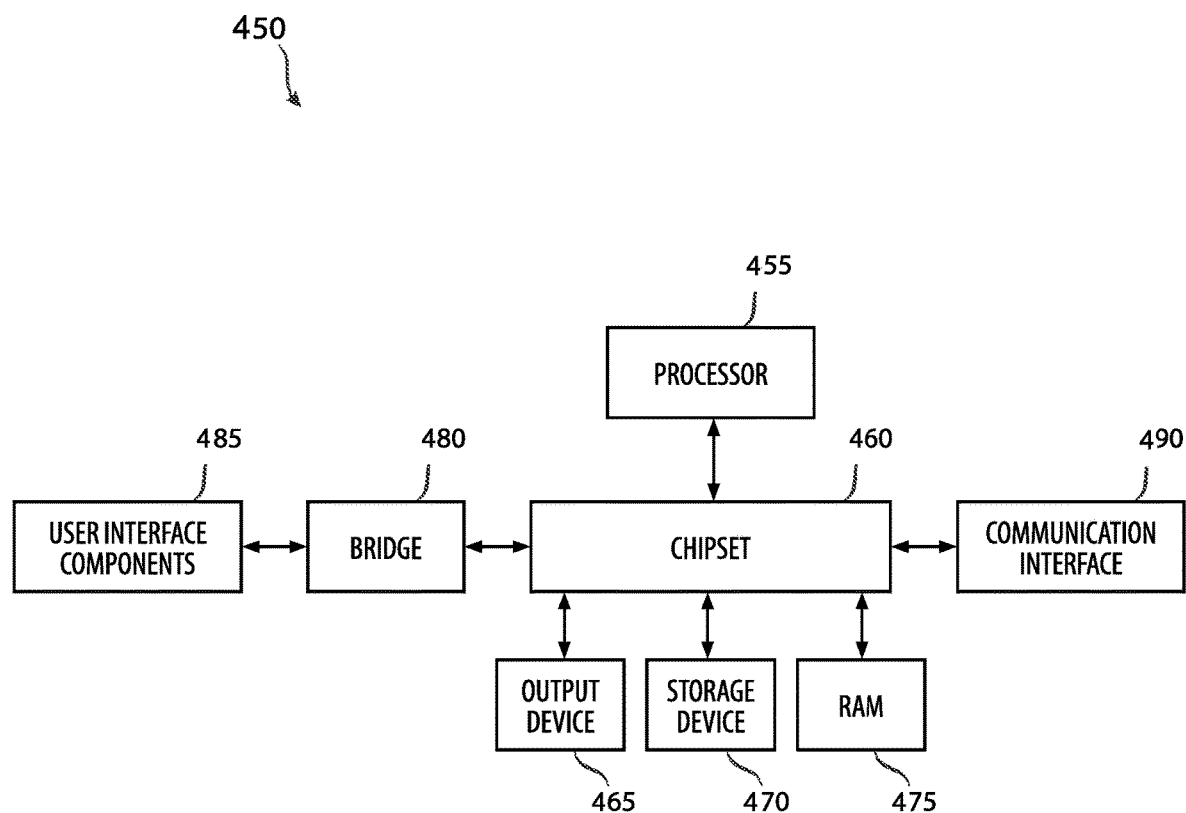

FIG. 4A and FIG. 4B illustrate example system embodiments. The more appropriate embodiment will be apparent to those of ordinary skill in the art when practicing the present technology. Persons of ordinary skill in the art will also readily appreciate that other system embodiments are possible.

FIG. 4A illustrates a conventional system bus computing system architecture 400 wherein the components of the system are in electrical, optical (photonic) communication with each other using a bus 405. System 400 can include a processing unit (CPU, GPU, or processor) 410 and a system bus 405 that couples various system components including the system memory 415, such as read only memory (ROM) 420 and random access memory (RAM) 425, to the processor 410. The system 400 can include a cache of high-speed memory connected directly with, in close proximity to, or integrated as part of the processor 410. The system 400 can copy data from the memory 415 and/or the storage device 430 to the cache 412 for quick access by the processor 410. In this way, the cache can provide a performance boost that avoids processor 410 delays while waiting for data. These and other modules can control or be configured to control the processor 410 to perform various actions. Other system memory 415 may be available for use as well. The memory 415 can include multiple different types of memory with different performance characteristics. The processor 410 can include any general purpose processor and a hardware module or software module, such as module 1 432, module 2 434, and module 3 436 stored in storage device 430, configured to control the processor 410 as well as a special-purpose processor where software instructions are incorporated into the actual processor design. The processor 410 may essentially be a completely self-contained computing system, containing multiple cores or processors, a bus, memory controller, cache, etc. A multi-core processor may be symmetric or asymmetric.

To enable user interaction with the computing device 400, an input device 445 can represent any number of input mechanisms, such as a microphone for speech, a touch-sensitive screen for gesture or graphical input, keyboard, mouse, motion input, speech and so forth. An output device 442 can also be one or more of a number of output mechanisms known to those of skill in the art. In some instances, multimodal systems can enable a user to provide multiple types of input to communicate with the computing device 400. The communications interface 440 can generally govern and manage the user input and system output. There is no restriction on operating on any particular hardware arrangement and therefore the basic features here may easily be substituted for improved hardware or firmware arrangements as they are developed.

Storage device 430 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 425, read only memory (ROM) 420, and hybrids thereof.

The storage device 430 can include software modules 432, 434, 436 for controlling the processor 410. Other hardware or software modules are contemplated. The storage device 430 can be connected to the system bus 405. In one aspect, a hardware module that performs a particular function can include the software component stored in a computer-readable medium in connection with the necessary hardware components, such as the processor 410, bus 405, display 435, and so forth, to carry out the function.

FIG. 4B illustrates an example computer system 450 having a chipset architecture that can be used in executing the described method and generating and displaying a graphical user interface (GUI). Computer system 450 can be computer hardware, software, and firmware that can be used to implement the disclosed technology. System 450 can include a processor 455, representative of any number of physically and/or logically distinct resources capable of executing software, firmware, and hardware configured to perform identified computations. Processor 455 can communicate with a chipset 460 that can control input to and output from processor 455. Chipset 460 can output information to output device 465, such as a display, and can read and write information to storage device 470, which can include magnetic media, and solid state media. Chipset 460 can also read data from and write data to RAM 475. A bridge 480 for interfacing with a variety of user interface components 485 can be provided for interfacing with chipset 460. Such user interface components 485 can include a keyboard, a microphone, touch detection and processing circuitry, a pointing device, such as a mouse, and so on. In general, inputs to system 450 can come from any of a variety of sources, machine generated and/or human generated.

Chipset 460 can also interface with one or more communication interfaces 490 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 455 analyzing data stored in storage 470 or 475. Further, the machine can receive inputs from a user via user interface components 485 and execute appropriate functions, such as browsing functions by interpreting these inputs using processor 455.

It can be appreciated that systems 400 and 450 can have more than one processor 410 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

The computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the aforementioned description can be implemented using computer-executable instructions that are stored or otherwise available from computer readable media. Such instructions can comprise instructions and data which cause or otherwise configure a general purpose computer, special purpose computer, or special purpose processing device to perform a certain function or group of functions. Portions of computer resources used can be accessible over a network. The computer executable instructions may be binaries, intermediate format instructions such as assembly language, firmware, or source code. Computer-readable media that may be used to store instructions, information used, and/or information created during methods according to the aforementioned description include magnetic or optical disks, flash memory, USB devices provided with non-volatile memory, networked storage devices, and so on.

Devices implementing methods according to these disclosures can comprise hardware, firmware and/or software, and can take any of a variety of form factors. Such form factors can include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device.

The instructions, media for conveying such instructions, computing resources for executing them, and other structures for supporting such computing resources are means for providing the functions described in these disclosures.

Statements of the disclosure include:

Statement 1: A method for determining a characteristic of a downhole environment includes receiving optical signal data from a downhole optical sensor deployed to a downhole environment, accessing a correlative mapping of optical properties to geological features of well paths, and determining a characteristic of the downhole environment directly based on the received optical signal data and the correlative mapping.

Statement 2: The method of any of the preceding Statements may further include determining the characteristic without performing interim processing including one or more of optical-to-chemical or chemical-to-geological processing.

Statement 3: The method of any of the preceding Statements may further include determining the characteristic further including processing the optical signal data by a model configured to determine one or more downhole environment characteristics based on optical signal data.

Statement 4: The method of preceding Statement 3 may further include the model including one or more of a trained machine learning model, a rules-based model, or a mixed model.

Statement 5: The method of any of the preceding Statements may further include the downhole optical sensor including a multivariate optical computing (MOC) device.

Statement 6: The method of preceding Statement 5 may further include the downhole optical sensor further including one or more multivariate optical elements (MOE), the MOEs in communication with the MOC.

Statement 7: The method of any of the preceding Statements may further include the optical signal data including one or more of an optical complex refractive index, a change in an optical complex refractive index, or a value corresponding to a capability of a material of altering a polarization state of incident light following interaction of the light with the material, the interaction being one of a transmission, reflection, refraction, or scattering.

Statement 8: A system for determining a characteristic of a downhole environment includes an optical sensor deployed to a downhole environment, one or more processors, and a memory comprising instructions to receive optical signal data from the optical sensor, access a correlative mapping of optical properties to geological features of well paths, and determine a characteristic of the downhole environment directly based on the received optical signal data and the correlative mapping.

Statement 9: The system of preceding Statement 8 may further include determining the characteristic without performing interim processing including one or more of optical-to-chemical or chemical-to-geological processing.

Statement 10: The system of any of preceding Statements 8-9 may further include determining the characteristic further including processing the optical signal data by a model configured to determine one or more downhole environment characteristics based on optical signal data.

Statement 11: The system of preceding Statement 10 may further include the model including one or more of a trained machine learning model, a rules-based model, or a mixed model.

Statement 12: The system of any of preceding Statements 8-11 may further include the optical sensor including a multivariate optical computing (MOC) device.

Statement 13: The system of preceding Statement 12 may further include the downhole optical sensor further including one or more multivariate optical elements (MOE), the MOEs in communication with the MOC.

Statement 14: The system of any of preceding Statements 8-14 may further include the optical signal data including one or more of an optical complex refractive index, a change in an optical complex refractive index, or a value corresponding to a capability of a material of altering a polarization state of incident light following interaction of the light with the material, the interaction being one of a transmission, reflection, refraction, or scattering.

Statement 15: A non-transitory computer readable medium stores instructions that, when executed by one or more processors, causes the one or more processors to receive optical signal data from a downhole optical sensor deployed to a downhole environment, the optical signal data including one or more of an optical complex refractive index, a change in an optical complex refractive index, or a value corresponding to a capability of a material of altering a polarization state of incident light following interaction of the light with the material, the interaction being one of a transmission, reflection, refraction, or scattering, access a correlative mapping of optical properties to geological features of well paths, and determine a characteristic of the downhole environment directly based on the received optical signal data and the correlative mapping.

Statement 16: The non-transitory computer readable medium of preceding Statement 15 may further include determining the characteristic without performing interim processing including one or more of optical-to-chemical or chemical-to-geological processing.

Statement 17: The non-transitory computer readable medium of any of preceding Statements 15-16 may further include determining the characteristic further including processing the optical signal data by a model configured to determine one or more downhole environment characteristics based on optical signal data.

Statement 18: The non-transitory computer readable medium of preceding Statement 17 may further include the model including one or more of a trained machine learning model, a rules-based model, or a mixed model.

Statement 19: The non-transitory computer readable medium of any of preceding Statements 15-17 may further include the downhole optical sensor including a multivariate optical computing (MOC) device.

Statement 20: The non-transitory computer readable medium of preceding Statement 19 may further include the downhole optical sensor further including one or more multivariate optical elements (MOE), the MOEs in communication with the MOC.

Although a variety of information was used to explain aspects within the scope of the appended claims, no limitation of the claims should be implied based on particular features or arrangements, as one of ordinary skill would be able to derive a wide variety of implementations. Further and although some subject matter may have been described in language specific to structural features and/or method steps, it is to be understood that the subject matter defined in the appended claims is not necessarily limited to these described features or acts. Such functionality can be distributed differently or performed in components other than those identified herein. Rather, the described features and steps are disclosed as possible components of systems and methods within the scope of the appended claims. Moreover, claim language reciting "at least one of" a set indicates that one member of the set or multiple members of the set satisfy the claim.

What is claimed is:

1. A method for determining a characteristic of a downhole environment, the method comprising:
   receiving optical signal data from a downhole optical sensor deployed to a downhole environment along a current well path;
   accessing a historical correlation of optical properties to geological features of mapped well paths;
   correlating the current well path with the historical correlation of optical properties to the geological features of at least one of the mapped well paths; and
   determining reservoir architecture along the current well path directly based on the received optical signal data and the historical correlation, wherein determining the reservoir architecture along the current well path are only characterized in situ and/or in real time.

2. The method of claim 1, wherein determining the reservoir architecture along the current well path is not based on interim processing including one or more of optical-to-chemical or chemical-to-geological processing.

3. The method of claim 1, wherein determining the reservoir architecture along the current well path further comprises processing the optical signal data by a model configured to determine one or more downhole environment characteristics based on the optical signal data.

4. The method of claim 3, wherein the model comprises one or more of a trained machine learning model, a rules-based model, or a mixed model.

5. The method of claim 1, wherein the downhole optical sensor includes a multivariate optical computing (MOC) device.

6. The method of claim 5, wherein the downhole optical sensor further comprises one or more multivariate optical elements (MOE), the MOEs in communication with the MOC.

7. The method of claim 1, wherein the optical signal data comprises one or more of an optical complex refractive index, a change in an optical complex refractive index, or a value corresponding to a capability of a material of altering a polarization state of incident light following interaction of light with the material, the interaction comprising one of a transmission, reflection, refraction, or scattering.

8. The method of claim 1, wherein the reservoir architecture includes reservoir continuity and compositional grading, interval productivity, reservoir charging mechanisms, filling histories, and/or migration pathways.

9. A system for determining a characteristic of a downhole environment, the system comprising:
   an optical sensor deployed to a downhole environment;
   one or more processors; and
   a memory comprising instructions to:
      receive optical signal data from the optical sensor along a current well path;
      access a historical correlation of optical properties to geological features of mapped well paths;
      correlate the current well path with the historical correlation of optical properties to the geological features of at least one of the mapped well paths; and
      determine reservoir architecture along the current well path directly based on the received optical signal data and the historical correlation, wherein determining the reservoir architecture along the current well path are only characterized in situ and/or in real time.

10. The system of claim 9, wherein determining the reservoir architecture along the current well path is not based on interim processing including one or more of optical-to-chemical or chemical-to-geological processing.

11. The system of claim 9, wherein determining the reservoir architecture along the current well path further comprises processing the optical signal data by a model configured to determine one or more downhole environment characteristics based on the optical signal data.

12. The system of claim 11, wherein the model comprises one or more of a trained machine learning model, a rules-based model, or a mixed model.

13. The system of claim 9, wherein the optical sensor includes a multivariate optical computing (MOC) device.

14. The system of claim 13, wherein the downhole optical sensor further comprises one or more multivariate optical elements (MOE), the MOEs in communication with the MOC.

15. The system of claim 9, wherein the optical signal data comprises one or more of an optical complex refractive index, a change in an optical complex refractive index, or a value corresponding to a capability of a material of altering a polarization state of incident light following interaction of light with the material, the interaction comprising one of a transmission, reflection, refraction, or scattering.

16. The system of claim 9, wherein the reservoir architecture includes reservoir continuity and compositional grading, interval productivity, reservoir charging mechanisms, filling histories, and/or migration pathways.

17. A non-transitory computer readable medium storing instructions that, when executed by one or more processors, causes the one or more processors to:
   receive optical signal data from a downhole optical sensor deployed to a downhole environment along a current well path, the optical signal data comprises one or more of an optical complex refractive index, a change in an optical complex refractive index, or a value corresponding to a capability of a material of altering a polarization state of incident light following interaction of light with the material, the interaction comprising one of a transmission, reflection, refraction, or scattering;

access a historical correlation of optical properties to geological features of mapped well paths;

correlate the current well path with the historical correlation of optical properties to the geological features of at least one of the mapped well paths; and determine reservoir architecture along the current well path directly based on the received optical signal data and the historical correlation, wherein determining the reservoir architecture along the current well path are only characterized in situ and/or in real time.

18. The non-transitory computer readable medium of claim 17, wherein determining the reservoir architecture along the current well path is not based on interim processing including one or more of optical-to-chemical or chemical-to-geological processing.

19. The non-transitory computer readable medium of claim 17, wherein determining the reservoir architecture along the current well path further comprises processing the optical signal data by a model configured to determine one or more downhole environment characteristics based on the optical signal data.

20. The non-transitory computer readable medium of claim 19, wherein the model comprises one or more of a trained machine learning model, a rules-based model, or a mixed model.

21. The non-transitory computer readable medium of claim 17, wherein the downhole optical sensor includes a multivariate optical computing (MOC) device.

22. The non-transitory computer readable medium of claim 21, wherein the downhole optical sensor further comprises one or more multivariate optical elements (MOE), the MOEs in communication with the MOC.

23. The non-transitory computer readable medium of claim 17, wherein the reservoir architecture includes reservoir continuity and compositional grading, interval productivity, reservoir charging mechanisms, filling histories, and/or migration pathways.

* * * * *